(12) United States Patent
Lewis et al.

(10) Patent No.: US 9,109,873 B1
(45) Date of Patent: Aug. 18, 2015

(54) APPARATUS AND METHOD FOR INSPECTING A TURBINE BLADE TIP SHROUD

(75) Inventors: Gareth Lewis, Greenville, SC (US); John David Ward, Jr., Woodruff, SC (US)

(73) Assignee: General Electric Company, Schenectady, NY (US)

( * ) Notice: Subject to any disclaimer, the term of this patent is extended or adjusted under 35 U.S.C. 154(b) by 475 days.

(21) Appl. No.: 13/425,461

(22) Filed: Mar. 21, 2012

(51) Int. Cl.
*G01B 3/14* (2006.01)
*G01B 3/20* (2006.01)
*G01B 5/00* (2006.01)

(52) U.S. Cl.
CPC .. *G01B 3/14* (2013.01); *G01B 3/20* (2013.01); *G01B 5/00* (2013.01)

(58) Field of Classification Search
CPC .............. G01B 3/14; G01B 5/00; G01B 5/14; G01B 5/20; G01B 5/205; G01B 3/20
USPC ................... 33/501, 501.05, 501.06, 501.08, 33/501.09, 530, 552, 567.1, 568, 655, 549, 33/567; 73/112.01
See application file for complete search history.

(56) References Cited

U.S. PATENT DOCUMENTS

| | | | | |
|---|---|---|---|---|
| 4,333,239 A | * | 6/1982 | Arrigoni | 33/535 |
| 4,916,942 A | * | 4/1990 | Davidson | 73/112.01 |
| 6,164,916 A | | 12/2000 | Frost et al. | |
| 6,842,995 B2 | | 1/2005 | Jones et al. | |
| 6,983,659 B2 | * | 1/2006 | Soechting et al. | 73/802 |
| 7,762,004 B2 | * | 7/2010 | Sherlock et al. | 33/562 |
| 8,043,061 B2 | | 10/2011 | Chiurato et al. | |

FOREIGN PATENT DOCUMENTS

| | | | | | |
|---|---|---|---|---|---|
| CN | 101943557 A | * | 1/2011 | | G01B 5/00 |
| CN | 102519333 A | * | 6/2012 | | G01B 5/00 |
| JP | 2006097649 A | * | 4/2006 | | F01D 25/00 |
| WO | WO 2008/094972 | | 8/2008 | | |

* cited by examiner

*Primary Examiner* — R. A. Smith

(57) ABSTRACT

An apparatus for inspecting a tip shroud includes a frame having top and bottom surfaces. A first stop is connected to the bottom surface to contact a first side surface of the tip shroud, and a second stop is in sliding engagement with the frame to contact a second side surface of the tip shroud. A method for inspecting a tip shroud includes placing an apparatus against the tip shroud, wherein the apparatus has a first stop connected to a frame and a second stop in sliding engagement with the frame. The method further includes engaging the first stop with a first side surface of the tip shroud and sliding the second stop with respect to the frame until the second stop contacts a second side surface of the tip shroud.

17 Claims, 6 Drawing Sheets

APPARATUS AND METHOD FOR INSPECTING A TURBINE BLADE TIP SHROUD

FIELD OF THE INVENTION

The present invention generally involves an apparatus and method for inspecting a turbine blade tip shroud. In particular embodiments, the apparatus may measure a chord length across the tip shroud.

BACKGROUND OF THE INVENTION

Turbines are widely used in industrial and commercial operations. A typical commercial steam or gas turbine used to generate electrical power includes alternating stages of stationary vanes and rotating blades. The stationary vanes may be attached to a stationary component such as a casing that surrounds the turbine, and the rotating blades may be attached to a rotor located along an axial centerline of the turbine. A compressed working fluid, such as but not limited to steam, combustion gases, or air, flows through the turbine, and the stationary vanes accelerate and direct the compressed working fluid onto the subsequent stage of rotating blades to impart motion to the rotating blades, thus turning the rotor and performing work.

Compressed working fluid that leaks around or bypasses the stationary vanes or rotating blades reduces the efficiency of the turbine. To reduce the amount of compressed working fluid that bypasses the rotating blades, the casing may include stationary shroud segments that surround each stage of rotating blades, and each rotating blade may include a tip shroud at an outer radial tip. Each tip shroud may include a seal rail that extends transversely across the tip shroud to form a seal between the rotating tip shroud and the stationary shroud segments. In addition, each tip shroud may include side surfaces that interlock with complementary side surfaces of adjacent tip shrouds to prevent adjacent tip shrouds from overlapping, reduce vibrations in the rotating blades, and enhance the seal between the rotating tip shrouds and the stationary shroud segments.

Over time, the side surfaces of the tip shrouds may erode or wear, creating gaps between adjacent tip shrouds that allow the rotating blades to twist and/or vibrate and increase the amount of compressed working fluid that bypasses the rotating blades. As a result, hardened materials are typically plated onto the side surfaces and periodically inspected to determine the amount of wear to the hardened materials. If the amount of wear is excessive, the entire rotating blade may need to be replaced. Otherwise, the tip shroud may be refurbished to restore and/or increase the thickness of the hardened materials on the side surfaces.

Previous efforts have been developed to determine the amount of erosion of the hardened materials. For example, measurements of various chord lengths across the tip shroud may be used to create a detailed coordinate map of the surface of the tip shroud. However, coordinate mapping is time-consuming and produces inconsistent results due to the geometric shape of the tip shroud. As a result, an improved apparatus and method for inspecting a turbine blade tip shroud would be useful.

BRIEF DESCRIPTION OF THE INVENTION

Aspects and advantages of the invention are set forth below in the following description, or may be obvious from the description, or may be learned through practice of the invention.

One embodiment of the present invention is an apparatus for inspecting a turbine blade tip shroud. The apparatus includes a frame having a top surface and a bottom surface. A first stop is connected to the bottom surface of the frame to contact a first side surface of the turbine blade tip shroud, and a second stop is in sliding engagement with the frame to contact a second side surface of the turbine blade tip shroud.

Another embodiment of the present invention is an apparatus for inspecting a turbine blade tip shroud that includes a frame, a first stop connected to a bottom surface of the frame to engage a first side surface of the turbine blade tip shroud, and a second stop in sliding engagement with the frame to engage a second side surface of the turbine blade tip shroud. The apparatus further includes means for aligning the frame on the turbine blade tip shroud.

The present invention may also include a method for inspecting a turbine blade tip shroud that includes placing an apparatus against the turbine blade tip shroud, wherein the apparatus has a first stop connected to a frame and a second stop in sliding engagement with the frame. The method further includes engaging the first stop with a first side surface of the turbine blade tip shroud and sliding the second stop with respect to the frame until the second stop contacts a second side surface of the turbine blade tip shroud.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
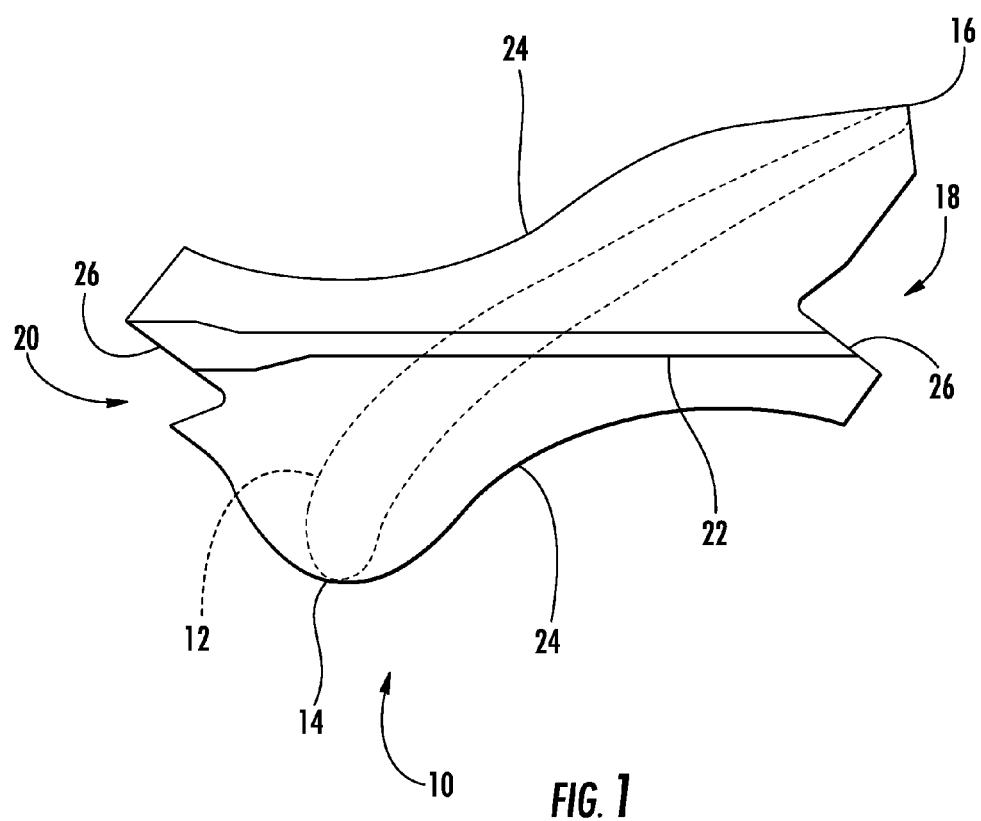
FIG. 1 is a top plan view of an exemplary turbine blade tip shroud.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include an apparatus and method for inspecting a turbine blade tip shroud. The apparatus generally includes a frame that can be placed over the tip shroud to identify an acceptable or non-acceptable dimension of the tip shroud. In particular embodiments, the frame may include one or more alignment features, and a first stop fixedly positioned on the frame to contact a first side surface of the tip shroud may be used to index the frame to a particular starting position. A second stop in sliding engagement with the frame may then be manipulated toward the first stop to contact a second side surface of the tip shroud. If the second stop reaches a predetermined length of travel before contacting the second side surface of the tip shroud, then the tip shroud may be too eroded to refurbish, and the tip shroud and/or turbine blade may require replacement. However, if the second stop contacts the second side surface of the tip shroud before reaching the predetermined length of travel, then the tip shroud may be refurbished to restore a hardened material to the first and/or second side surfaces. Although exemplary embodiments of the present invention will be described generally in the context of a turbine blade tip shroud for purposes of illustration, one of ordinary skill in the art will readily appreciate that embodiments of the present invention are not limited to a turbine blade tip shroud unless specifically recited in the claims.

FIG. 1 provides a top plan view of an exemplary turbine blade tip shroud 10. The tip shroud 10 is located at a radial tip of a rotating blade 12, with the outline of the rotating blade 12 beneath the tip shroud 10 shown in phantom in FIG. 1. The tip shroud 10 generally includes a leading edge 14 and a trailing edge 16 that correspond to the direction of airflow over the rotating blade 12. In addition, the tip shroud 10 includes a first side surface 18 generally opposed to a second side surface 20, with a seal rail 22 extending across the tip shroud 10 from the first side surface 18 to the second side surface 20. The first and second side surfaces 18, 20 may additionally include scalloped surfaces 24 and hardened surfaces 26 designed to interlock with side surfaces of adjacent tip shrouds. For example, in the exemplary tip shroud 10 shown in FIG. 1, the hardened surfaces 26 appear as z-shaped notches in the first and second side surfaces 18, 20.

Figure 2:
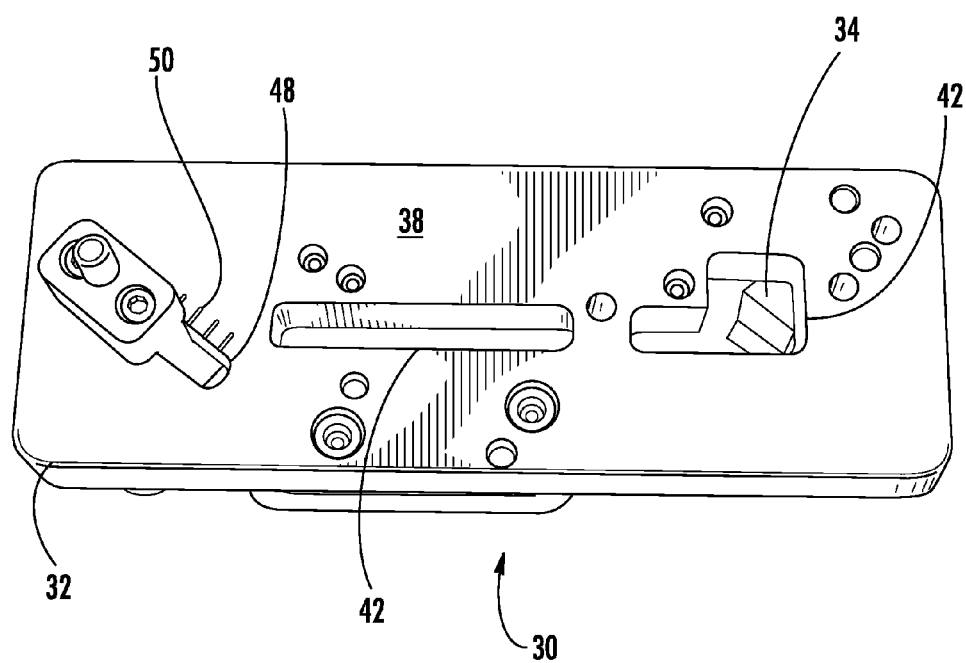
FIG. 2 is a top perspective view of an apparatus for inspecting a turbine blade tip shroud according to one embodiment of the present invention.
Figure 3:
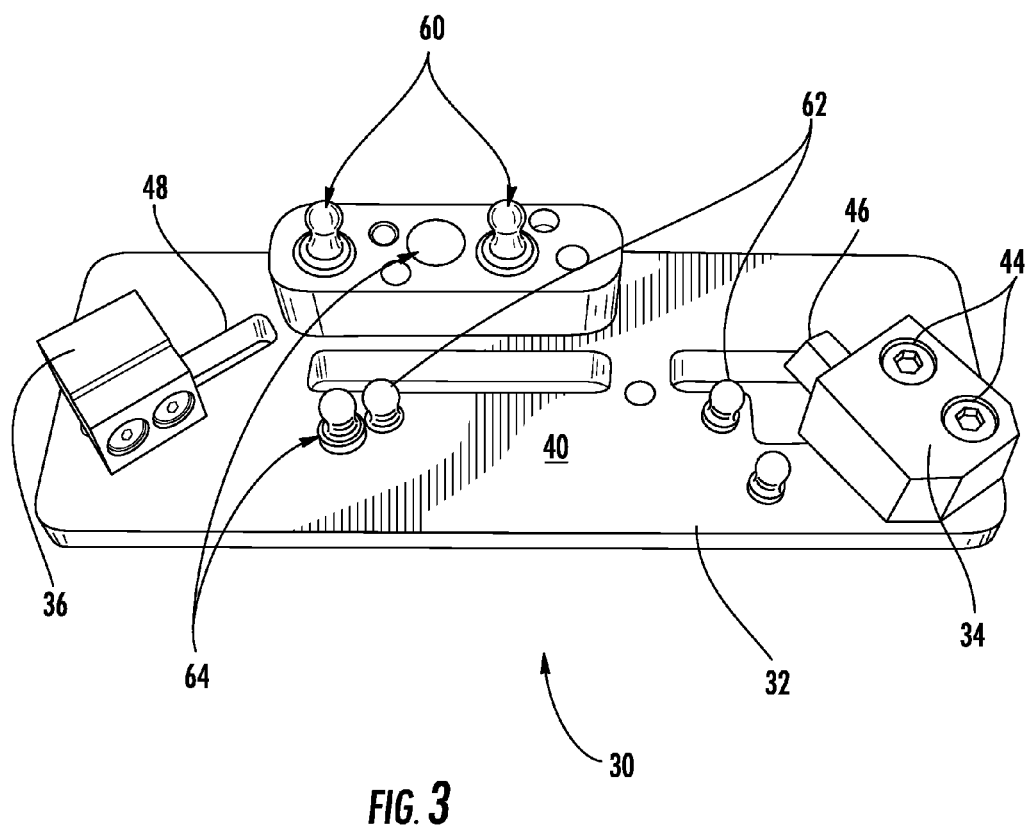
FIG. 3 is a bottom perspective view of the apparatus shown in FIG. 2.

FIG. 2 provides a top perspective view of an apparatus 30 for inspecting a turbine blade tip shroud 10 according to one embodiment of the present invention, and FIG. 3 provides a bottom perspective view of the apparatus 30 shown in FIG. 2. The apparatus 30 generally includes a frame 32 that precisely positions first and second stops 34, 36 with respect to the tip shroud 10. The frame 32 may be made from wood, plastic, fiberglass, metal, or any other suitably durable materials capable of maintaining their shape. The frame 32 includes a top surface 38 and a bottom surface 40 and may further include one or more viewing holes 42 or other passages to allow visual observation of the tip shroud 10, the first stop 34, and/or the second stop 36 through the frame 32.

The first and second stops 34, 36 are precisely positioned on the frame 32 to contact specific portions of the first and second side surfaces 18, 20, respectively. For example, a bolt 44, screw, or other device may be used to releasably attach the first stop 34 to a particular location on the frame 32 so that a first surface 46 of the first stop 34 is precisely aligned to contact a specific portion of the first side surface 18 of the tip shroud 10. If desired, the first stop 34 and the first surface 46 may be repositioned and/or re-oriented on the frame 32 so that the same apparatus 30 may be used to inspect multiple tip shrouds having different geometries.

The second stop 36 is in sliding engagement with the frame 32 to contact a specific portion of the second side surface 20 of the turbine blade tip shroud 10. For example, as shown in FIGS. 2 and 3, the frame 32 may include a slot 48 having a predetermined length and orientation with respect to the first stop 34. In particular embodiments, the slot 48 may be oriented perpendicular to or parallel to the first surface 46, depending on the particular orientation of the first surface 46 of the first stop 34. Alternately or in addition, the frame 32 may include an incremented scale 50 adjacent to the slot 48 and/or second stop 36 to measure the amount of movement of the second stop 36 in the slot 48. In this manner, the second stop 36 may ride in the slot 48 until the second stop 36 either contacts the specific portion of the second side surface 20 or the second stop 36 reaches the end of the slot 48. If the second stop 36 contacts the specific portion of the second side surface 20 before reaching the end of the slot 48, then the tip shroud 10 may be refurbished, for example, by restoring a hardened material to the first and/or second side surfaces 18, 20. Alternately, if the second stop 36 reaches the end of the slot 48 before contacting the specific portion of the second side surface 20, then the tip shroud 10 may be too eroded or worn to refurbish.

As shown more clearly in FIG. 3, the apparatus 30 may further include various means for aligning the frame 32 on the turbine blade tip shroud 10. In particular embodiments, the function of the means may be to longitudinally, transversely, and/or radially align the frame 32 with respect to the tip shroud 10. The structure for the means may include various combinations of resilient tabs and/or projections that extend from the bottom surface 40 of the frame 32. In the particular embodiment shown in FIG. 3, for example, the means for aligning the frame 32 with respect to the tip shroud 10 includes a plurality of resilient tabs 60 that extend away from the frame 32. The resilient tabs 60 may be positioned on the frame 32 so that when the frame 32 is placed on the tip shroud 10, the resilient tabs 60 act as bumpers or guides around the leading and/or trailing edges 14, 16 of the tip shroud 10 to position the frame 32 longitudinally and/or transversely with respect to the tip shroud 10. Alternately or in addition, the means for aligning the frame 32 with respect to the tip shroud 10 may include first projections 62 and/or second projections 64 on the bottom surface 40 of the frame 32. As shown in FIG. 3, the first projections 62 may be positioned on the frame 32 to rest against or contact the seal rail 22 to position the frame 32 longitudinally with respect to the tip shroud 10. Similarly, the second projections 64 may be positioned on the frame to act as spacers between the bottom surface 40 of the frame 32 and the tip shroud 10. In this manner, the second projections 64 may position the frame 32 radially with respect to the tip shroud 10.

Figure 4:
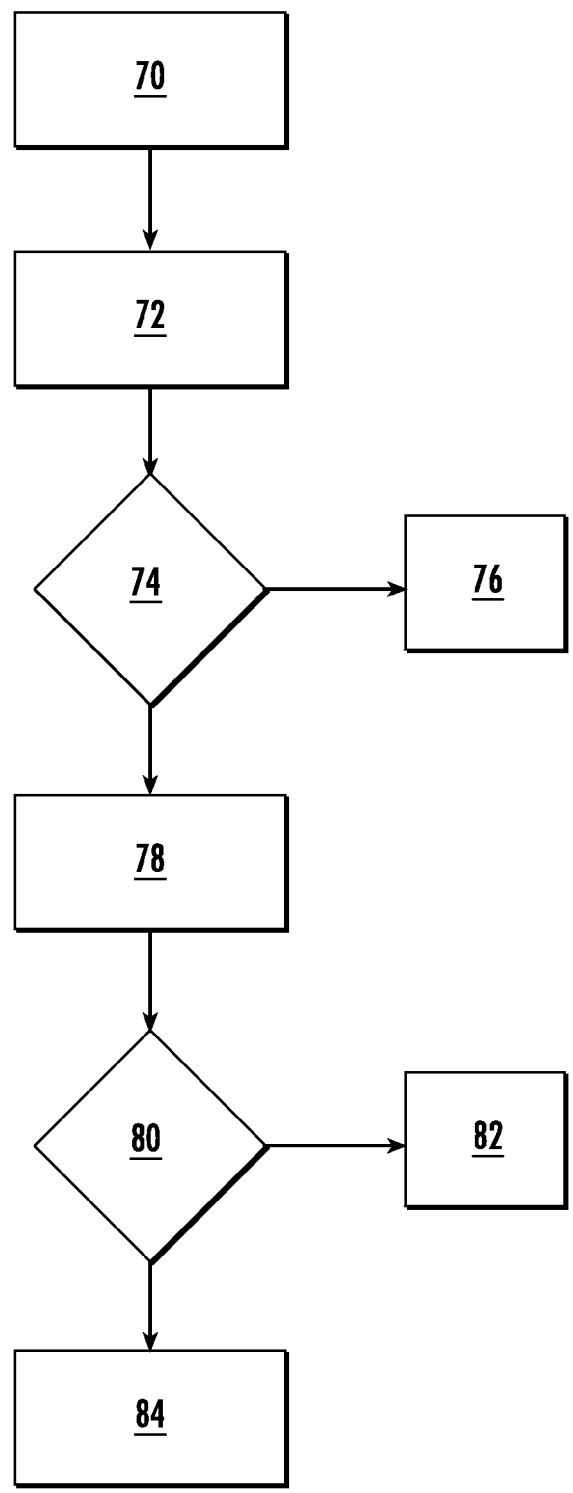
FIG. 4 is a flow diagram of a method for inspecting a turbine blade tip shroud.
Figure 5:
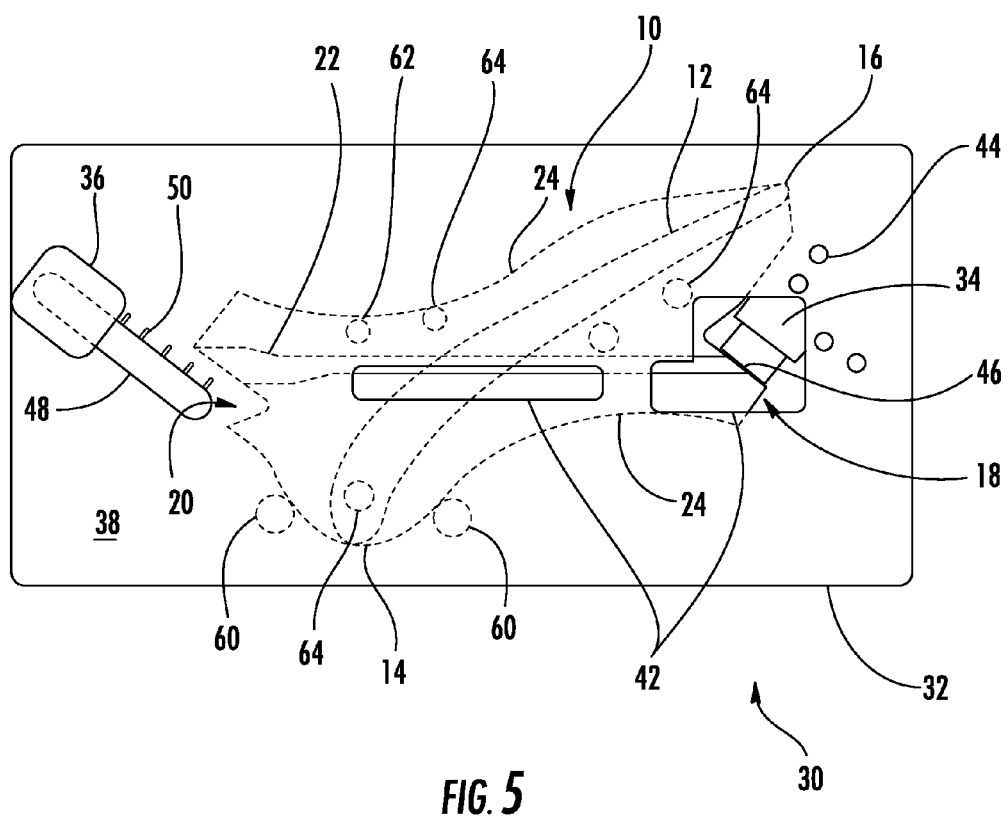
FIG. 5 is a top plan view of the apparatus shown in FIG. 2 positioned on the turbine blade tip shroud shown in FIG. 1.
Figure 6:
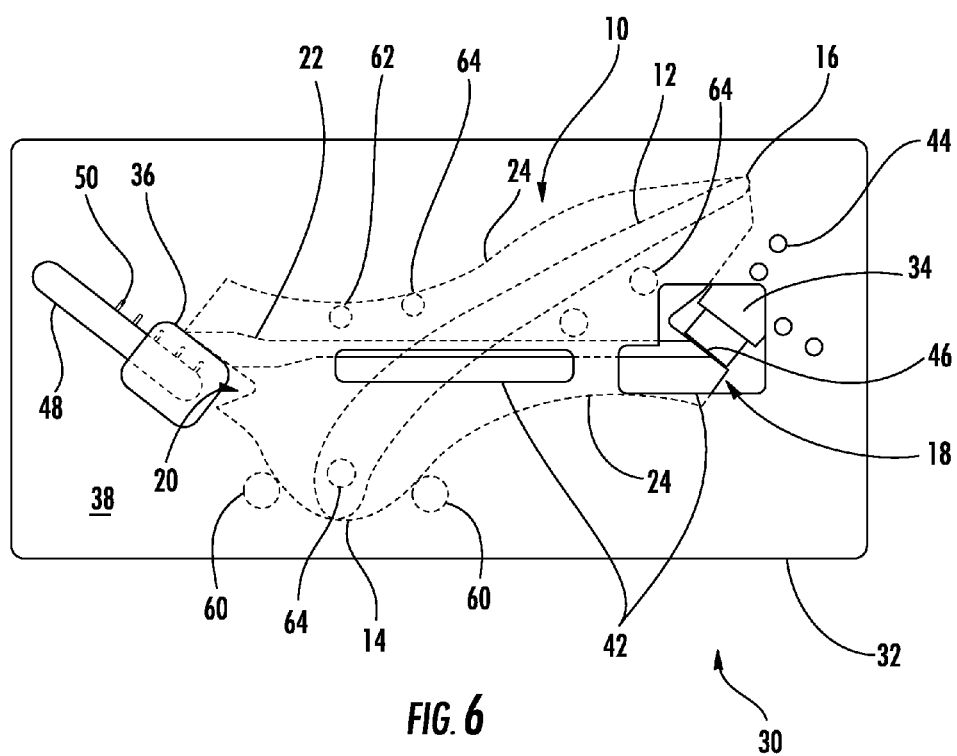
FIG. 6 is a top plan view of the apparatus shown in FIG. 2 measuring the turbine blade tip shroud shown in FIG. 1.

FIG. 4 provides a flow diagram of a method for inspecting the turbine blade tip shroud 10, and FIGS. 5 and 6 provide top plan views of the apparatus 30 shown in FIGS. 2 and 3 positioned on the turbine blade tip shroud 10 shown in FIG. 1. At block 70, the inspection removes the rotating blade tip shroud 10 from the turbine so that the first and second side surfaces 18, 20 are accessible to the apparatus 30. At block 72, the inspection places the apparatus 30 on the tip shroud 10. As shown in FIG. 5, the second stop 36 is fully retracted in the slot 48 away from the first stop 34. In addition, the resilient tabs 60 bracket the leading edge 14 of the tip shroud 10, and the first projections 62 rest against the seal rail 22 to transversely and longitudinally align the frame 32 with respect to the tip shroud 10. Moreover, the second projections 64 rest on the tip shroud 10 to radially space the frame 32 from the tip shroud 10.

Returning to FIG. 4, at block 74, the inspection checks the position of the first stop 34 with respect to the first side surface 18 of the tip shroud 10. If the apparatus 30 is properly positioned on the tip shroud 10 and the first stop 34 is not in direct contact with the first side surface 18, then the tip shroud 10 fails the inspection as indicated by block 76. If the apparatus 30 is properly positioned on the tip shroud 10 and the first stop 34 is in direct contact with the first side surface 18, then the inspection proceeds to the next step.

At block 78, the second stop 36 is moved inside the slot 48 until the second stop 36 either contacts the second side surface 20 or the second stop 36 reaches the end of the slot 48. As shown in FIG. 6, the second stop 36 has been moved substantially parallel to the first surface 46 of the first stop 34 until the second stop 36 contacted the second side surface 20. At block 80, the inspection checks the position of the second stop 36 with respect to the second side surface 20. If the second stop 36 reaches the end of the slot 48 before contacting the second side surface 20, then the tip shroud 10 fails the inspection as indicated by block 82. Alternately, if the second stop 36 contacts the second side surface 20 before reaching the end of the slot 48, then the tip shroud 10 passes the inspection. The position of the second stop 36 indicated on the scale 50 may be recorded, and the tip shroud 10 may be refurbished or re-installed, as indicated by block 84.

One of ordinary skill in the art can readily appreciate that the apparatus 30 and methods described herein reduce the time required to consistently inspect the side surfaces 18, 20 of the tip shroud 10 to determine whether refurbishment of the tip shroud is either possible or necessary. As a result, the embodiments described herein may reliably identify only those tip shrouds 10 requiring refurbishment, thus reducing the outage associated with the inspection and refurbishment of the tip shrouds 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for inspecting a turbine blade tip shroud, comprising:
   a. a frame, wherein said frame comprises a top surface and a bottom surface;
   b. a first stop connected to said bottom surface of said frame to contact a first side surface of the turbine blade tip shroud;
   c. a second stop in sliding engagement with said frame to contact a second side surface of the turbine blade tip shroud; and
   d. a slot in said frame, wherein said slot has a predetermined length and said second stop is in sliding engagement with said slot in said frame.

2. The apparatus as in claim 1, wherein said first stop defines a first surface to contact the first side surface of the turbine blade tip shroud, and said second stop slides substantially parallel to said first surface.

3. The apparatus as in claim 1, further comprising an incremented scale on said frame adjacent to said second stop.

4. The apparatus as in claim 1, further comprising means for longitudinally aligning said frame on the turbine blade tip shroud.

5. The apparatus as in claim 1, further comprising means for transversely aligning said frame on the turbine blade tip shroud.

6. The apparatus as in claim 1, further comprising means for radially aligning said frame on the turbine blade tip shroud.

7. The apparatus as in claim 1, further comprising a plurality of tabs resiliently connected to said bottom surface of said frame.

8. An apparatus for inspecting a turbine blade tip shroud, comprising:
   a. a frame;
   b. a first stop connected to a bottom surface of said frame to engage a first side surface of the turbine blade tip shroud;
   c. a second stop in sliding engagement with a slot in said frame comprising a predetermined length to engage a second side surface of the turbine blade tip shroud; and
   d. means for aligning said frame on the turbine blade tip shroud.

9. The apparatus as in claim 8, wherein said first stop defines a first surface to contact the first side surface of the turbine blade tip shroud, and said second stop slides substantially parallel to said first surface.

10. The apparatus as in claim 8, further comprising an incremented scale on said frame.

11. The apparatus as in claim 8, further comprising a plurality of tabs resiliently connected to said bottom surface of said frame.

12. A method for inspecting a turbine blade tip shroud, comprising:
   a. placing an apparatus against the turbine blade tip shroud, wherein said apparatus has a first stop connected to a frame and a second stop in sliding engagement with said frame;
   b. engaging said first stop with a first side surface of the turbine blade tip shroud, wherein engaging said first stop with said first side surface of the turbine blade tip shroud comprises sliding said first stop with respect to said frame until said first stop contacts said first side surface of the turbine blade tip shroud; and
   c. sliding said second stop with respect to said frame until said second stop contacts a second side surface of the turbine blade tip shroud.

13. The method as in claim 12, further comprising sliding said second stop substantially parallel to a first surface on said first stop engaged with the first side surface of the turbine blade tip shroud.

14. The method as in claim 12, further comprising aligning said apparatus longitudinally with respect to the turbine blade tip shroud.

15. The method as in claim 12, further comprising aligning said apparatus transversely with respect to the turbine blade tip shroud.

16. The method as in claim 12, further comprising aligning said apparatus radially with respect to the turbine blade tip shroud.

17. The method as in claim 12, further comprising measuring a position of said second stop when said second stop contacts the second side surface of the turbine blade tip shroud.

* * * * *